(12) United States Patent
Feng et al.

(10) Patent No.: US 11,509,985 B2
(45) Date of Patent: Nov. 22, 2022

(54) EARPHONE CHARGING DEVICE

(71) Applicant: DONGGUAN LUXSHARE PRECISION INDUSTRY CO. LTD., Dongguan (CN)

(72) Inventors: Yun Feng, Dongguan (CN); Guoqin Huang, Dongguan (CN); Yong Huang, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 3 days.

(21) Appl. No.: 17/374,204

(22) Filed: Jul. 13, 2021

(65) Prior Publication Data
US 2022/0124424 A1 Apr. 21, 2022

(30) Foreign Application Priority Data
Oct. 21, 2020 (CN) .......................... 202022359826.0

(51) Int. Cl.
| H04R 1/10 | (2006.01) |
| H02J 7/00 | (2006.01) |
| H02J 50/10 | (2016.01) |
| H04B 1/3816 | (2015.01) |
| H04R 1/02 | (2006.01) |

(52) U.S. Cl.
CPC .......... *H04R 1/1025* (2013.01); *H02J 7/0044* (2013.01); *H02J 7/0047* (2013.01); *H02J 50/10* (2016.02); *H04B 1/3816* (2013.01); *H04R 1/02* (2013.01); *H04R 1/1016* (2013.01); *H04R 2420/07* (2013.01); *H04R 2499/10* (2013.01)

(58) Field of Classification Search
CPC ...... H04R 1/1025; H04R 1/02; H04R 1/1016; H04R 2420/07; H04R 2499/10; H02J 50/10; H02J 7/0044; H02J 7/0047; G06F 1/1641; G06F 1/1652; G06F 1/1654; H04B 1/3816
See application file for complete search history.

(56) References Cited

U.S. PATENT DOCUMENTS

| 10,129,626 | B1 * | 11/2018 | Jung ........................ H02J 7/342 |
| 11,172,101 | B1 * | 11/2021 | Boozer .............. H04N 5/23241 |
| 2020/0336820 | A1 * | 10/2020 | Tasaka ..................... H04N 5/76 |
| 2021/0006888 | A1 * | 1/2021 | Geng .................... H04R 1/1041 |
| 2021/0296915 | A1 * | 9/2021 | Feng ..................... H02J 7/0044 |
| 2022/0109923 | A1 * | 4/2022 | Rajasekaran ........ H04R 1/1025 |

FOREIGN PATENT DOCUMENTS

| CN | 209103286 U | 7/2019 |
| CN | 210130481 U | 3/2020 |
| CN | 211266533 U | 8/2020 |
| WO | WO 2020/156495 A1 | 8/2020 |

\* cited by examiner

*Primary Examiner* — Jason R Kurr
(74) *Attorney, Agent, or Firm* — Birch, Stewart, Kolasch & Birch, LLP (57) ABSTRACT

The present disclosure discloses an earphone charging device including a lower box portion having a main control circuit, an upper cap portion covering the lower box portion, and a display screen positioning around the lower box portion. The display screen includes a first portion firmly secured to the lower box portion and at least one second portion floatably connected to the lower box portion. The present disclosure can not only provide a high-leveled visual feeling of the large screen, but also realize a rapid storage of the display screen.

20 Claims, 11 Drawing Sheets

EARPHONE CHARGING DEVICE

CROSS-REFERENCE TO RELATED APPLICATION

This patent application claims a priority of a Chinese Patent Application No. 202022359826.0, filed on Oct. 21, 2020 and titled "EARPHONE CHARGING DEVICE", the entire content of which is incorporated herein by reference.

TECHNICAL FIELD

The present disclosure relates to a field of electronic products, in particular to an earphone charging device.

BACKGROUNDING

With a rapid development of wireless communication technologies such as Bluetooth technology, TWS (True Wireless Stereo) earphones have developed rapidly. More and more people are accustomed to use TWS earphones in office, travel and fitness places. At present, TWS earphones usually use charging boxes for charging and storage. In an existing charging box, a casing of the charging box is made into a display area. However, for such a display screen that is completely fitted and fixed on the surface of the casing of the charging box, the displayed content is restricted by the size of the charging box.

SUMMARY

An object of the present disclosure is to provide an earphone charging device, which not only provides a high-leveled visual feeling of the large screen, but also realizes a fast put away of the display screen.

In order to achieve the above object, the present disclosure discloses an earphone charging device including a lower box portion having a main control circuit, an upper cap portion covering the lower box portion, and a display screen positioning around the lower box portion. The display screen includes a first portion firmly secured to the lower box portion and at least one second portion flexibly and floatably connected to the lower box portion.

Compared with the prior art, the earphone charging device of the present disclosure not only provides a high-leveled visual feeling of the large screen, but also realizes a rapid put away of the display screen. When the earphone charging device of the present disclosure needs to use the display function, the display screen is unfolded relative to the lower box portion to provide consumers with a high-leveled visual feeling of a large screen, which is more popular with consumers. When the earphone charging device of the present disclosure does not need to use the display function, the second movable portion of the display screen can be quickly put away and received into the receiving channel on the lower box portion.

DETAILED DESCRIPTION

Referring to FIGS. 1 to 11, an earphone charging device 100 includes a lower box portion 2, an upper cap portion 3 covering the lower box portion 2, and a display screen 4 attached to the lower box portion 2.

Figure 9:
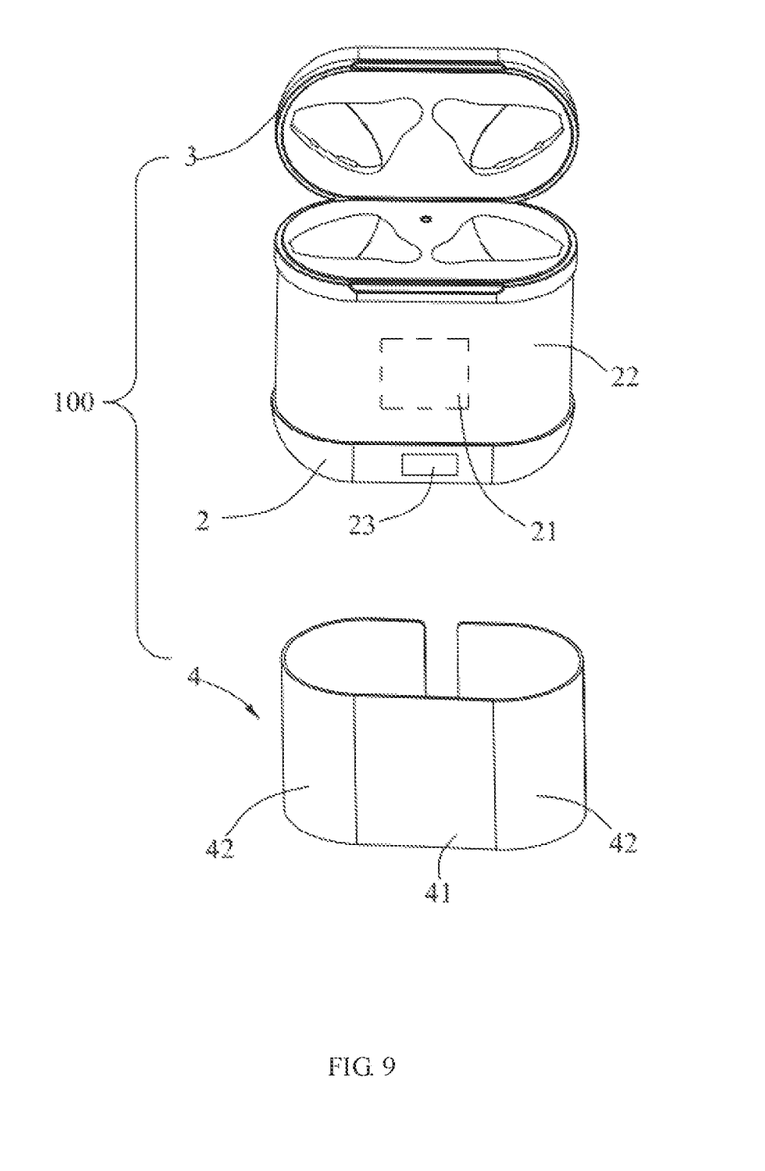
FIG. 9 is a perspective, exploded view of the earphone charging device in accordance with the present disclosure.
Figure 10:
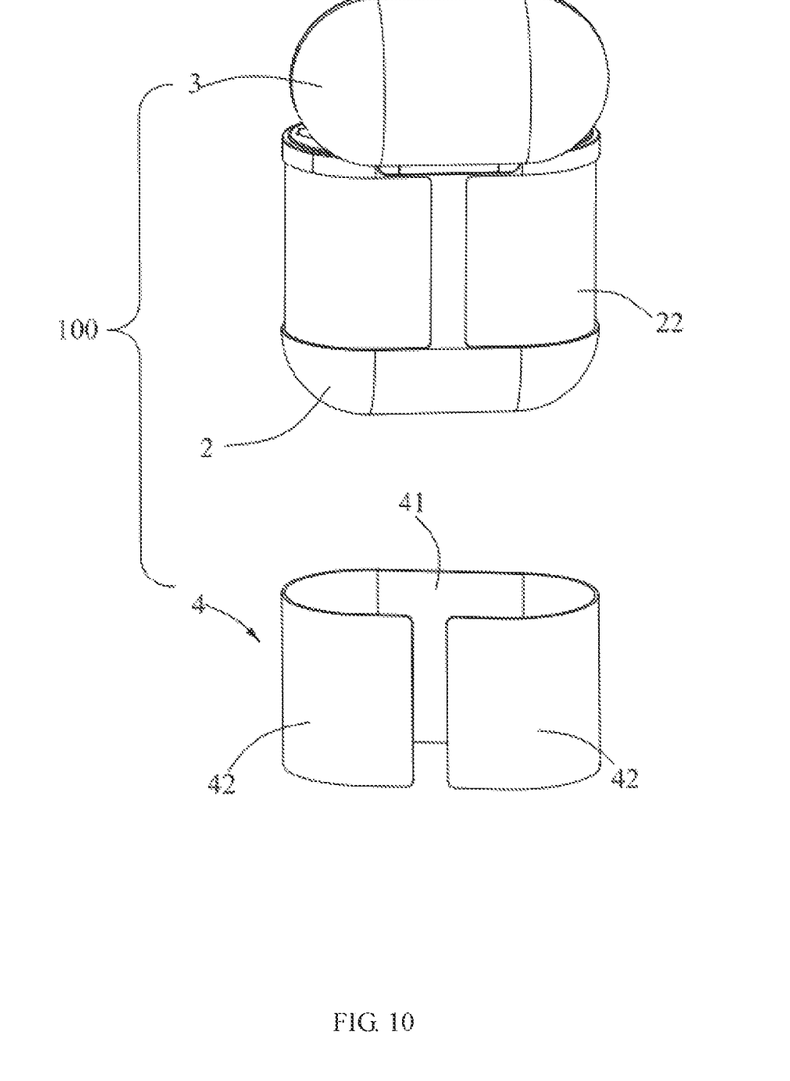
FIG. 10 is similar to FIG. 9 but taken a view from another angle.
Figure 11:
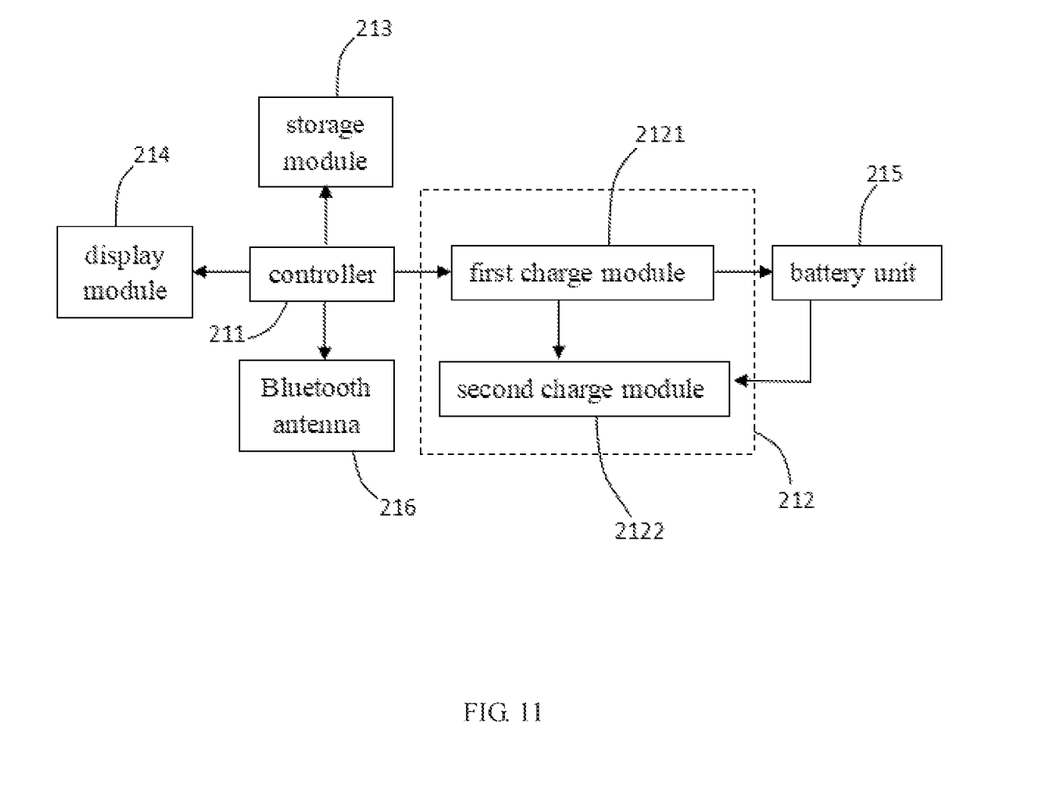
FIG. 11 is a schematic diagram of a main control circuit of the earphone charging device in accordance with the present disclosure.

Referring to FIGS. 9 to 11, a main control circuit 21 is positioned inside the lower box portion 2 and may comprise a circuit board but it is not limited. The main control circuit 21 includes a controller 211, a charge module 212, a storage module 213, and a display module 214. The controller 211 is electrically connected to the charge module 212, the storage module 213, and the display module 214. The display module 214 is located on the display screen 4. The charge module 212 is used to charge the TWS Bluetooth earphones 5. In general, after the controller 211 detects that the TWS Bluetooth earphones 5 are placed in the earphone charging device 100 of the present disclosure, the controller 211 sends instruction to the charge module 212 for the charge module 212 to charge the TWS Bluetooth earphones 5. The storage module 213 is used to store screen data which is going to be displayed on the display screen 4. In general, after the controller 211 receives signal of the charging status of the TWS Bluetooth earphones 5, the controller 211 turns on the display module 214. The controller 211 calls the screen data stored in the storage module 213 and displays the corresponding screen data through the display module 214 to indicate the corresponding charging status of the TWS Bluetooth earphones 5.

Referring to FIGS. 9 to 11, the main control circuit 21 includes a battery unit 215. The charge module 212 includes a first charge module 2121 and a second charge module 2122. The first charge module 2121 is electrically connected to the second charge module 2122 and is also electrically connected to the battery unit 215. When the power of the battery unit 215 is higher than the threshold set in advance, the battery unit 215 provides power to the second charge module 2122, and the first charge module 2121 is idle and does not work; when the power of the battery unit 215 is lower than the threshold set in advance, the first charge module 2121 provides power to both the second charge module 2122 and the battery unit 215. In other words, when the power of the battery unit 215 is sufficient, the battery unit 215 provides power to the second charge module 2122, and then the second charge module 2122 charges the TWS Bluetooth earphones 5; when the power of the battery unit 215 is low, the first charge module 2121 provides power to the second charge module 2122, and the second charge module 2122 charges the TWS Bluetooth earphones 5 and the battery unit 215 at the same time. In this way, the battery unit 215 can be prevented from being damaged due to lack of electricity. In this embodiment, the first charge module 2121 is a wireless charging coil module, while in an alternatively embodiment, the first charge module 2121 can also be a USB power supply module.

Figure 1:
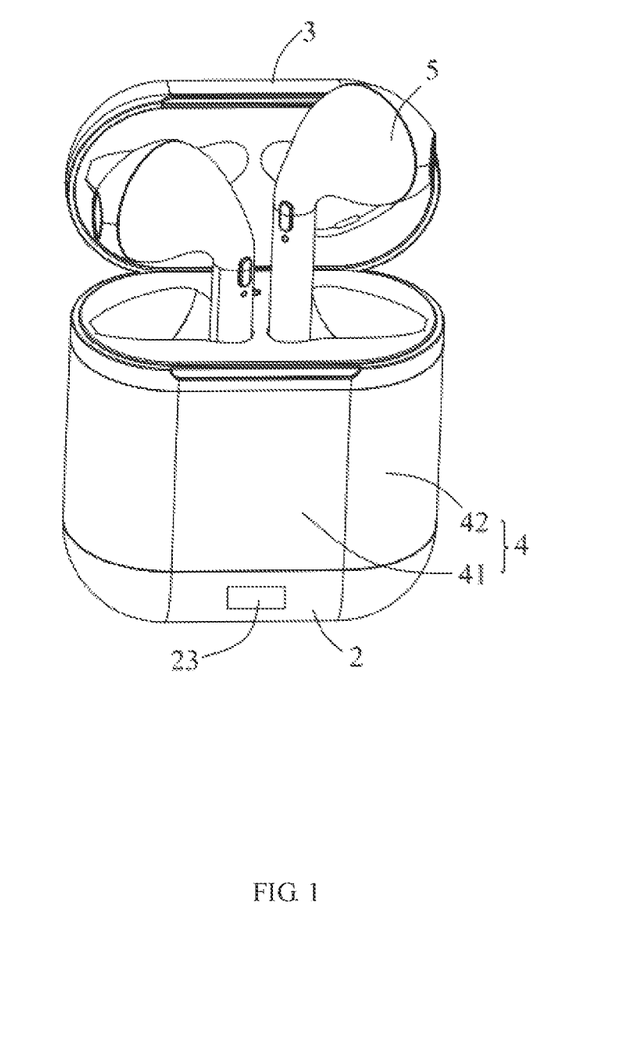
FIG. 1 is a perspective, assembled view of an earphone charging device in accordance with the present disclosure, when a pair of earphones are inserted into the earphone charging device and a display screen of the earphone charging device is not in use.

Referring to FIG. 1 and FIG. 9, the lower box portion 2 defines a card slot 23, and a subscriber identity module card (SIM card) can be inserted into the card slot 23. The SIM card is electrically connected to the controller 211 of the main control circuit 21 through the card slot 23. In an alternatively embodiment, the SIM card is embedded on the circuit board of the main control circuit 21 and is electrically connected to the controller 211.

Referring to FIG. 11, the lower box portion 2 also includes a Bluetooth antenna 216. The controller 211 is electrically connected to the Bluetooth antenna 216. The controller 211 performs signal communication with an external device (for example, a mobile phone) through the Bluetooth antenna 216, and receives the screen data transmitted by the external device and stores the screen data in the storage module 213.

Referring to FIGS. 1 to 11, the upper cap portion 3 is pivotably connected to the lower box portion 2. The upper cap portion 3 can cover an upper opening of the lower box portion 2. More preferably, the upper cap portion 3 and the lower box portion 2 are connected by a rotating shaft (not shown).

Referring to FIG. 9 and FIG. 10, the lower box portion 2 defines a receiving channel 22 on an outer surface of. The display screen 4 includes a first immovable portion 41 and a pair of second movable portions 42. The second movable portions 42 floatably connected the lower box portion 2 extend from two lateral sides of the first immovable portion 41. The first immovable portion 41 is fixed in the receiving channel 22. The second movable portions 42 can be fitted into the receiving channel 22 when the second movable portions 42 are pushed by external force.

Based on cost and assembly considerations, the first immovable portion 41 is fixed in the receiving channel 22 by sticking in a specific embodiment of the present disclosure; when the display screen 4 needs high adhesion strength in other embodiments, the first immovable portion 41 may also be mechanically fixed in the receiving channel 22, for example, locking with screws.

Figure 2:
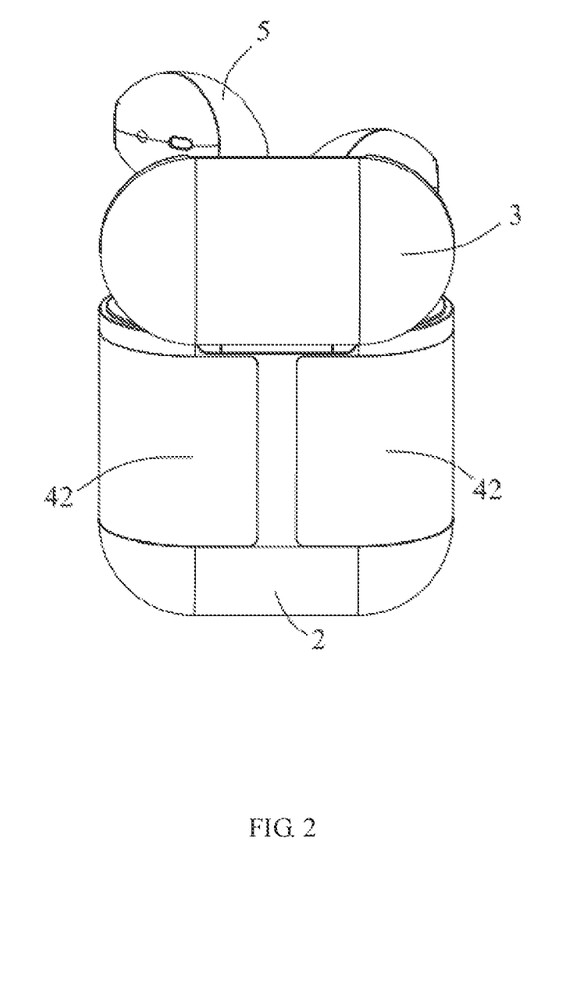
FIG. 2 is similar to FIG. 1 but taken a view from another angle.

Referring to FIGS. 1 to 10 and in particular to FIGS. 1 and 2, the second movable portions 42 are curly located in the receiving channel 22 when the display screen 4 is in an original not-in-use state. Referring to FIGS. 1 to 10 and in particular to FIGS. 3 to 8, the second movable portions 42 can be separated from the receiving channel 22 so that the display screen 4 has a plurality of deformed states relative to the original not-in-use state.

The present disclosure is also provided with a plurality of positioning members (not shown). When the second movable portion 42 is not in use, the positioning members can stably hold the second movable portions 42 in the receiving channel 22. That is, the method of holding the second movable portions 42 in the receiving channel 22 may be magnetic attraction by arranging a magnet or snapped by arranging protrusions and cutouts. For a first example, each second movable portion 42 forms a first magnet and a second magnet is positioned in the receiving channel 22 too. The first magnet and the second magnet magnetically attract to each other, thereby holding the second movable portions 42 in the receiving channel 22. For a second example, each second movable portion 42 forms a protrusion and a cutout is positioned in the receiving channel 22. The protrusion is received and oriented in the cutout, thereby holding the second movable portions 42 in the receiving channel 22. Of course, the positions of the protrusions and the cutouts can be interchanged to achieve the same purpose.

Figure 3:
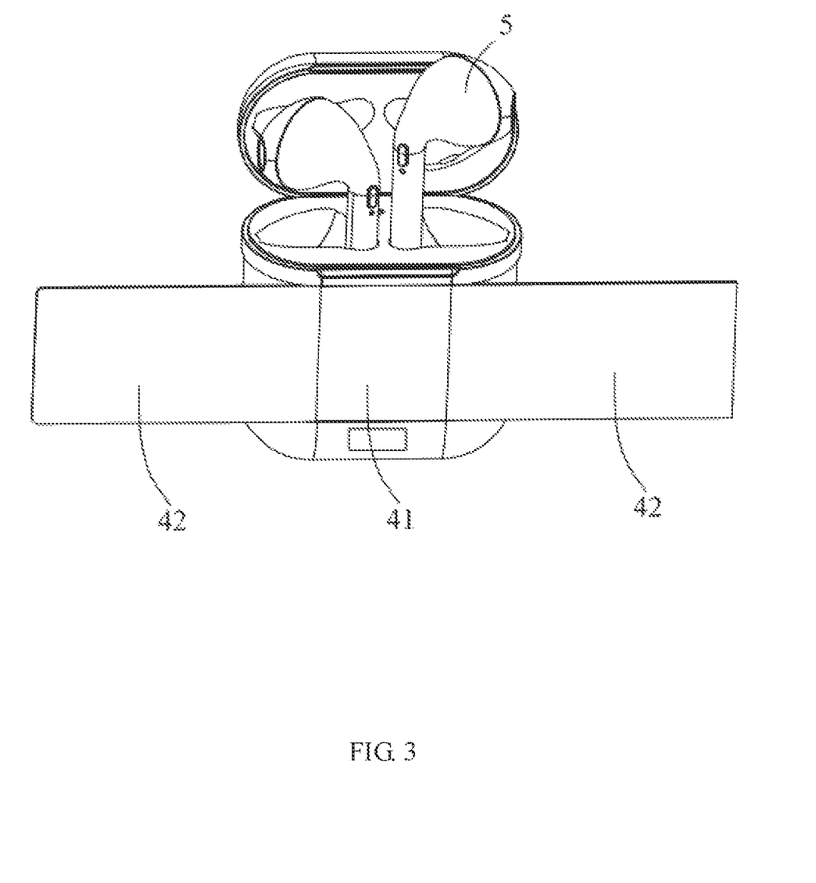
FIG. 3 is a perspective, assembled view of the earphone charging device in accordance with the present disclosure, when the earphones are inserted into the earphone charging device and the display screen of the earphone charging device is in a first using state.
Figure 4:
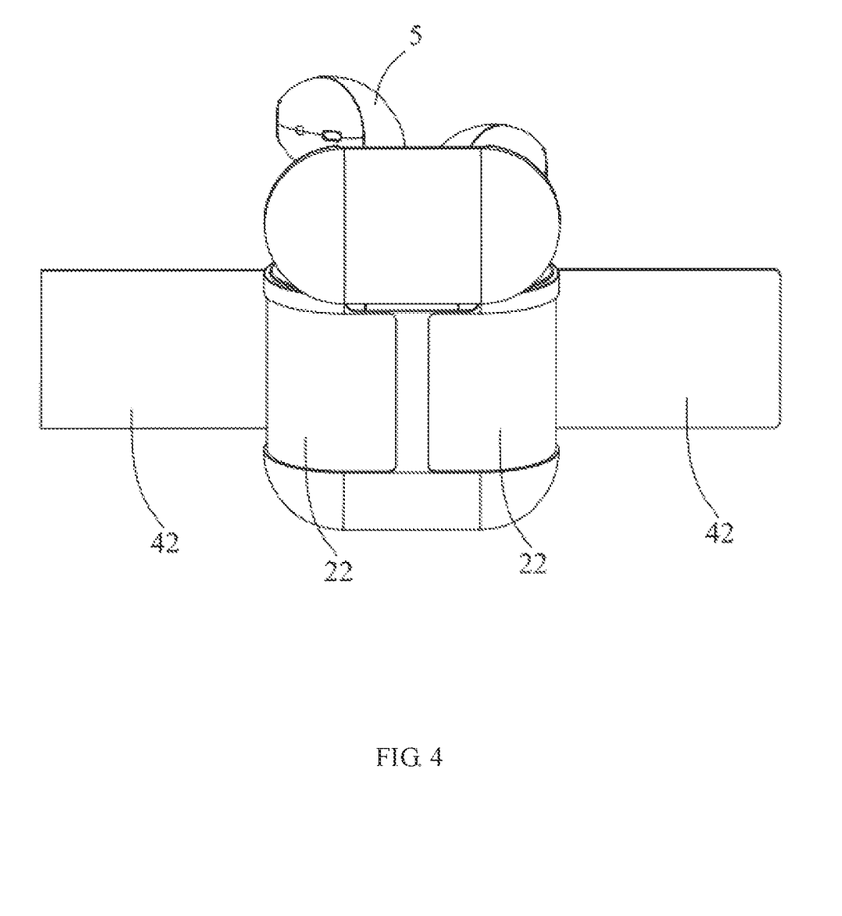
FIG. 4 is similar to FIG. 3 but taken a view from another angle.
Figure 5:
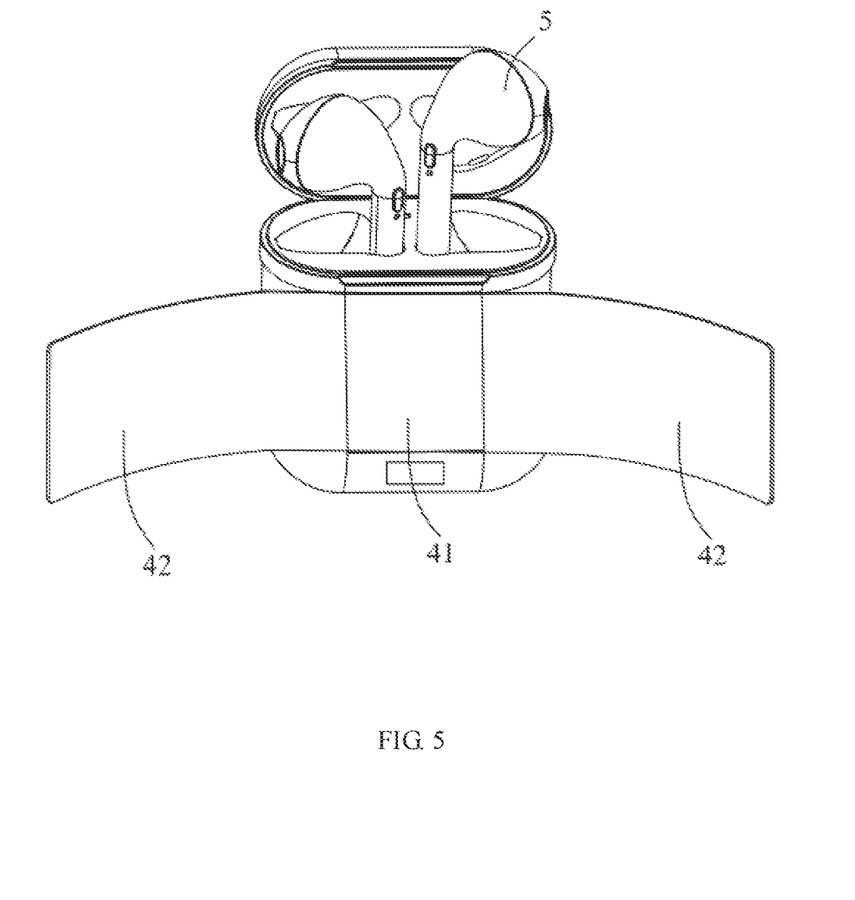
FIG. 5 is a perspective, assembled view of the earphone charging device in accordance with the present disclosure, when the earphones are inserted into the earphone charging device and the display screen of the earphone charging device is in a second using state.
Figure 6:
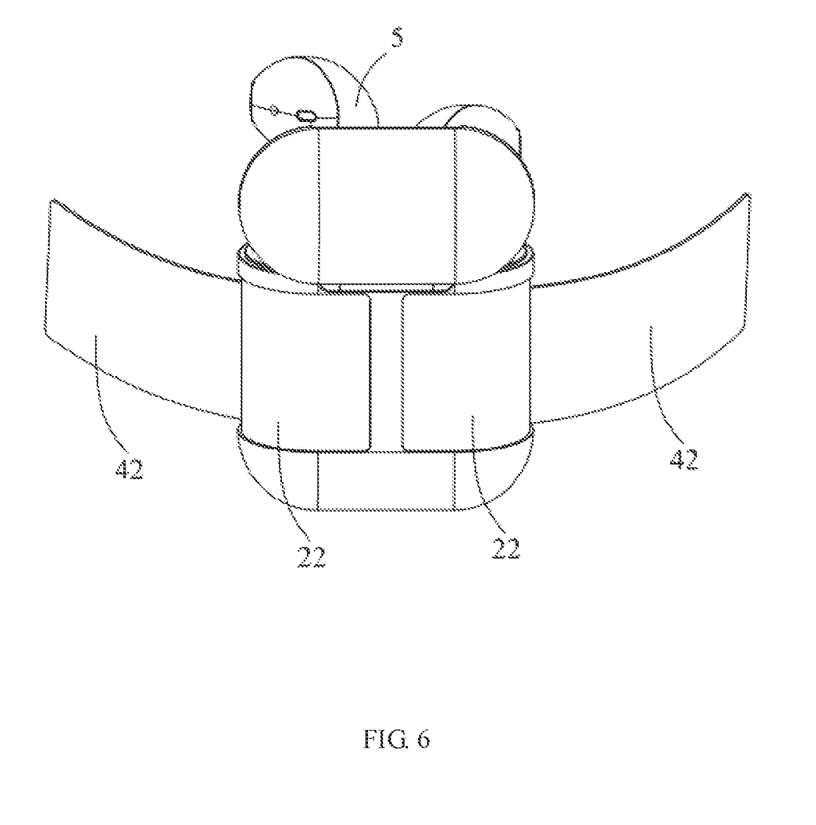
FIG. 6 is similar to FIG. 5 but taken a view from another angle.
Figure 7:
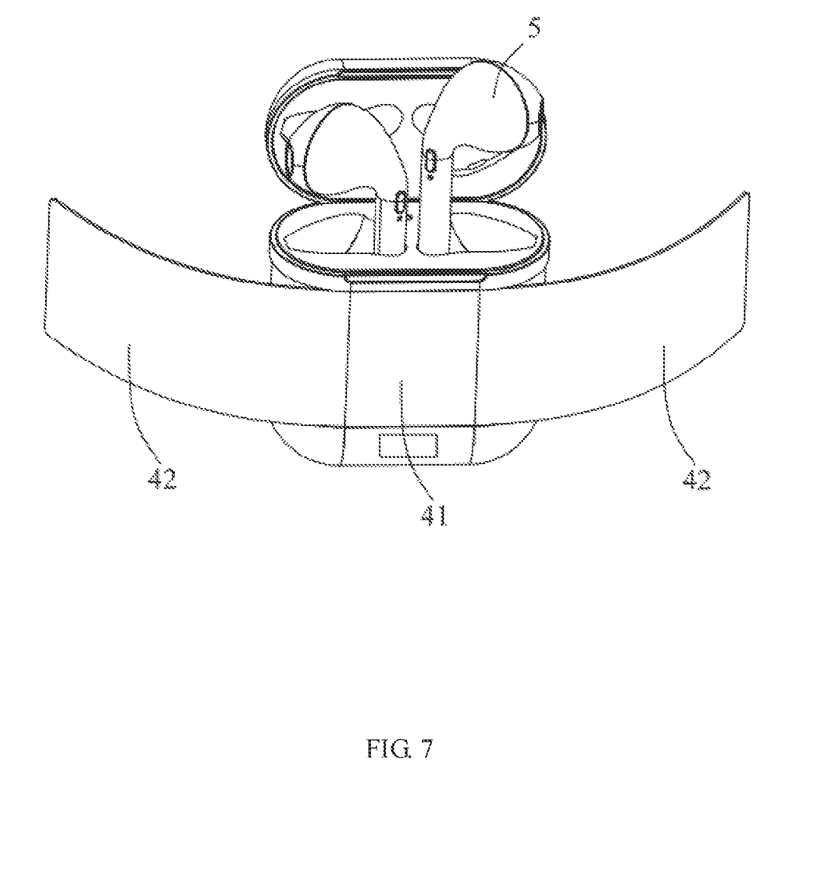
FIG. 7 is a perspective, assembled view of the earphone charging device in accordance with the present disclosure, when the earphones are inserted into the earphone charging device and the display screen of the earphone charging device is going to be stowed.
Figure 8:
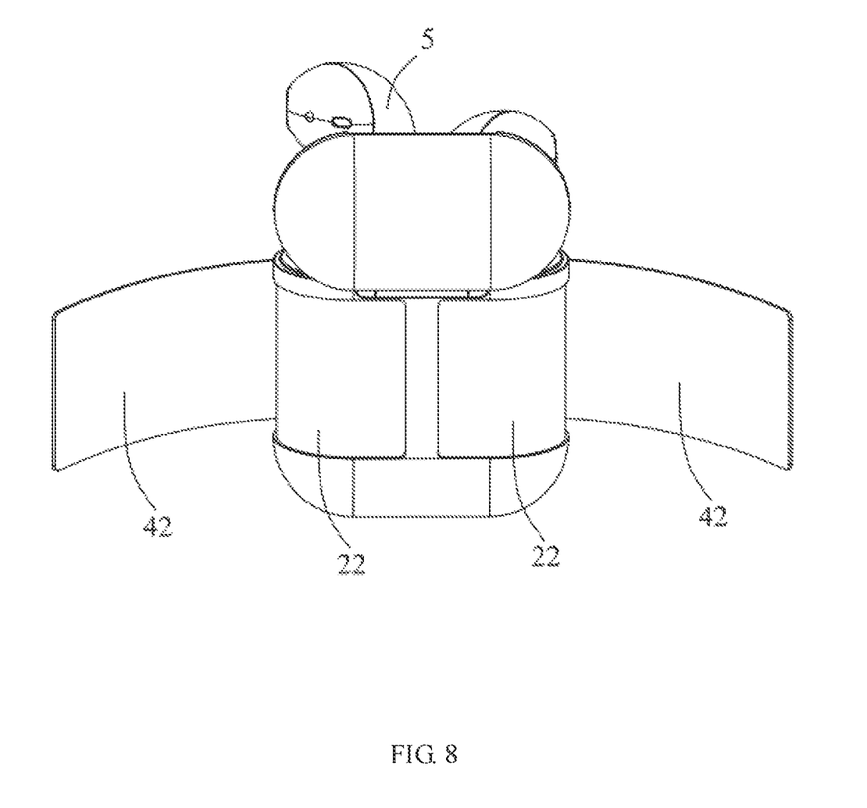
FIG. 8 is similar to FIG. 7 but taken a view from another angle.

The deformed states comprise a first using state, a second using state, and a third ready-to-be-stored state. As shown in FIGS. 3 and 4, in the first using state, the second movable portion 42 and the first immovable portion 41 are located on a same plane. As shown in FIGS. 5 and 6, in the second using state, the second movable portion 42 is bent away from other exposed surfaces of the lower box portion 2 relative to the first immovable portion 41. As shown in FIG. 7 and FIG. 8, in the third ready-to-be-stored state, the second movable portion 42 is bent toward the other exposed surfaces of the lower box portion 2 relative to the first portion 41.

In the first using state, the display screen 4 is used as a large flat screen. In the second using state, the display screen 4 is used as a large curved screen, which can provide users with a more advanced and fashionable high-tech experience. In both the first using state and the second using state, the earphone charging device 100 can be positioned directly by placing it on a desktop using the side width of the display screen 4.

The third ready-to-be-stored state is a transition between the first using state and the not-in-use state.

In a specific embodiment, the display screen 4 is an OLED (Organic Light-Emitting Diode) flexible display screen 4, so as to realize the conversion between every two states of the original not-in-use state, the first using state, the second using state, and the ready-to-be-stored state.

In summary, the earphone charging device 100 of the present disclosure includes a display screen 4. The first immovable portion 41 of the display screen 4 is fixedly connected to the lower box portion 2 and the second movable portion 42 of the display screen 4 is floatingly connected to the lower box portion 2. Therefore, when the earphone charging device 100 of the present disclosure needs to use the display function, the display screen 4 is unfolded relative to the lower box portion 2 to provide consumers with a high-leveled visual feeling of a large screen, which is more popular with consumers. When the earphone charging device 100 of the present disclosure does not need to use the display function, the second movable portion 42 of the display screen 4 can be quickly stored and received into the receiving channel 22 on the lower box portion 2. Therefore, the present disclosure can not only provide a high-leveled visual feeling of the large screen, but also realize a rapid put away of the display screen 4.

The above embodiments are only used to illustrate the present disclosure and not to limit the technical solutions described in the present disclosure. The understanding of this specification should be based on those skilled in the art. Descriptions of directions, such as "front", "back", "left", "right", "upper" and "lower", although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An earphone charging device, comprising:
   a lower box portion having a main control circuit;
   an upper cap portion covering the lower box portion; and
   a display screen positioning around the lower box portion, the display screen comprising a first portion firmly secured to the lower box portion and at least one second portion floatably connected to the lower box portion.

2. The earphone charging device according to claim 1, wherein the lower box portion defines a receiving channel on an outer surface thereof, the first portion is fixed in the receiving channel, the at least one second portion comprises a pair of second portions extending from two lateral sides of the first portion, and the second portions are received in the receiving channel.

3. The earphone charging device according to claim 2, wherein the first portion is fixed in the receiving channel by a sticking method or a screwing method.

4. The earphone charging device according to claim 2, further comprising a plurality of positioning members stably holding the second portions in the receiving channel.

5. The earphone charging device according to claim 4, wherein the positioning members comprise a pair of attracted magnets.

6. The earphone charging device according to claim 4, wherein the positioning members comprise protrusions and cutouts mated with the protrusions.

7. The earphone charging device according to claim 1, wherein the main control circuit includes a controller, a charge module, a storage module, and a display module; the charge module, the storage module and the display module are respectively and electrically connected to the controller, and the display module is located on the display screen.

8. The earphone charging device according to claim 7, wherein the main control circuit comprises a battery unit, the charge module comprises a first charge module and a second charge module, the first charge module is electrically connected to the second charge module, and the first charge module is electrically connected to the battery unit as well.

9. The earphone charging device according to claim 7, further comprising a subscriber identity module card, wherein the lower box portion defines a card slot, the subscriber identity module card is inserted into the card slot so as to be electrically connected to the controller.

10. The earphone charging device according to claim 7, the main control circuit comprises a Bluetooth antenna, and the Bluetooth antenna is electrically connected to the controller.

11. An earphone charging device, comprising:
    a box portion having a main control circuit, the box portion defining a receiving channel on an outer surface thereof;
    a cap portion pivotably connected to the box portion; and
    a flexible display screen attached to the box portion, the flexible display screen comprising a first immovable portion fixed with the box portion and a pair of second movable portions extending from two lateral sides of the first immovable portion, the second movable portions having at least two statuses with respective to the receiving channel.

12. The earphone charging device according to claim 11, wherein the second movable portions are deformed towards the receiving channel via a first external force for not-using the flexible display screen, the second movable portions are deformed away from the receiving channel via a second external force for using the flexible display screen, and the first external force is opposite to the second external force.

13. The earphone charging device according to claim 12, wherein the earphone charging device can be placed on a desktop with the help of the flexible display screen when the flexible display screen is in use.

14. The earphone charging device according to claim 11, wherein the first immovable portion is fixed in the receiving channel by a sticking method or a screwing method.

15. The earphone charging device according to claim 11, further comprising a plurality of positioning members stably holding the second movable portions in the receiving channel.

16. The earphone charging device according to claim 15, wherein the positioning members comprise a pair of attracted magnets.

17. The earphone charging device according to claim 15, wherein the positioning members comprise protrusions and cutouts mated with the protrusions.

18. The earphone charging device according to claim 11, wherein the main control circuit includes a controller, a charge module, a storage module, and a display module; the charge module, the storage module and the display module are respectively and electrically connected to the controller, and the display module is located on the flexible display screen.

19. The earphone charging device according to claim 18, wherein the main control circuit comprises a battery unit and a Bluetooth antenna, the battery unit is electrically connected to the charge module, and the Bluetooth antenna is electrically connected to the controller.

20. The earphone charging device according to claim 19, wherein the charge module comprises a first module and a second module;
    the first module provides electricity for the second module; or, the first module provides electricity to the battery unit and then the battery unit provides electricity to the second module.

* * * * *

UNITED STATES PATENT AND TRADEMARK OFFICE
CERTIFICATE OF CORRECTION

| | |
|---|---|
| PATENT NO. | : 11,509,985 B2 |
| APPLICATION NO. | : 17/374204 |
| DATED | : November 22, 2022 |
| INVENTOR(S) | : Yun Feng et al. |

It is certified that error appears in the above-identified patent and that said Letters Patent is hereby corrected as shown below:

On the Title Page

Item (73), Assignee, Change:
"DONGGUAN LUXSHARE TECHNOLOGIES CO., LTD, Dongguan (CN)"
To:
--DONGGUAN LUXSHARE PRECISION INDUSTRY CO. LTD., Dongguan (CN)--

Signed and Sealed this
Tenth Day of September, 2024

Katherine Kelly Vidal
*Director of the United States Patent and Trademark Office*